(12) United States Patent
Ha et al.

(10) Patent No.: US 11,605,827 B2
(45) Date of Patent: Mar. 14, 2023

(54) APPARATUS FOR REGULATING PRESSURE OF EXHAUST GAS OF FUEL CELL SYSTEM

(71) Applicants: Hyundai Motor Company, Seoul (KR); KIA Motors Corporation, Seoul (KR)

(72) Inventors: Kyoung Ku Ha, Gyeonggi-do (KR); Byeong Seung Lee, Seoul (KR); Jeong Hee Park, Gyeonggi-do (KR)

(73) Assignees: Hyundai Motor Company, Seoul (KR); KIA Motors Corporation, Seoul (KR)

(*) Notice: Subject to any disclaimer, the term of this patent is extended or adjusted under 35 U.S.C. 154(b) by 700 days.

(21) Appl. No.: 16/376,772

(22) Filed: Apr. 5, 2019

(65) Prior Publication Data
US 2020/0185745 A1 Jun. 11, 2020

(30) Foreign Application Priority Data
Dec. 11, 2018 (KR) .......................... 10-2018-0159393

(51) Int. Cl.
| H01M 8/04746 | (2016.01) |
| F01N 1/08 | (2006.01) |
| F01N 1/16 | (2006.01) |
| F16L 55/04 | (2006.01) |

(52) U.S. Cl.
CPC ........ *H01M 8/04761* (2013.01); *F01N 1/082* (2013.01); *F01N 1/16* (2013.01); *F16L 55/04* (2013.01); *H01M 2250/20* (2013.01)

(58) Field of Classification Search
CPC ....... H01M 8/04761; F01N 1/082; F01N 1/16
See application file for complete search history.

(56) References Cited

U.S. PATENT DOCUMENTS

| 340,696 A | 4/1886 | Caldwell |
| 4,150,696 A | 4/1979 | Meier et al. |
| 5,394,786 A | 3/1995 | Gettle et al. |

FOREIGN PATENT DOCUMENTS

| DE | 19510859 C1 | 8/1996 |
| EP | 2683971 A1 | 1/2014 |
| JP | 2011236962 A | 11/2011 |
| JP | 2017026101 A | 2/2017 |
| WO | WO 2012/120453 A1 | 9/2012 |

OTHER PUBLICATIONS

Extended European Search Report for EP 19166952.2, dated Oct. 22, 2019 (68 pages).

*Primary Examiner* — Nathanael T Zemui
(74) *Attorney, Agent, or Firm* — Lempia Summerfield Katz LLC

(57) ABSTRACT

An apparatus for regulating pressure of exhaust gas of a fuel cell system includes porous foam mounted in an exhaust tube and having a plurality of pores therein and a regulator that compresses or expands the porous foam to regulate a differential pressure of the exhaust gas flowing through the exhaust tube.

9 Claims, 3 Drawing Sheets

APPARATUS FOR REGULATING PRESSURE OF EXHAUST GAS OF FUEL CELL SYSTEM

CROSS-REFERENCE TO RELATED APPLICATION

This application is claims the benefit of and priority to Korean Patent Application No. 10-2018-0159393, filed on Dec. 11, 2018, the entire contents of which are incorporated herein by reference.

FIELD

The present disclosure relates to an apparatus for regulating the pressure of exhaust gas of a fuel cell system.

BACKGROUND

The statements in this section merely provide background information related to the present disclosure and may not constitute prior art.

Fuel cell systems, which produce electrical energy through an electro-chemical reaction of fuel supplied thereto, have been studied and developed.

The fuel cell systems may be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), and a direct methanol fuel cell (DMFC) according to the types of electrolytes used. The fuel cell systems may be applied to various applications, such as mobile power supply, transportation, distributed power generation, and the like, according to operating temperatures and output ranges along with the types of fuels used.

Among the fuel cells mentioned above, the PEMFC is applied to a hydrogen vehicle (a hydrogen fueled cell vehicle) that is being developed to replace an internal combustion engine.

The hydrogen vehicle is driven by producing electricity through an electro-chemical reaction of hydrogen and oxygen and operating a motor with the electricity produced. Accordingly, the hydrogen vehicle has a structure that includes a hydrogen ($H_2$) tank for storing hydrogen ($H_2$), a fuel cell stack (FC stack) for producing electricity through oxidation/reduction reactions of hydrogen ($H_2$) and oxygen ($O_2$), various apparatuses for draining water produced, a battery for storing the electricity produced by the fuel cell stack, a controller for converting and controlling the electricity produced, a motor for generating a driving force, and the like.

The fuel cell stack refers to a fuel cell body having tens or hundreds of cells stacked one above another in series. The fuel cell stack has a structure in which a plurality of cells are stacked between end plates, each cell including an electrolyte membrane that divides the interior of the cell into two parts, an anode on one side of the electrolyte membrane, and a cathode on the other side thereof.

A separator is disposed between the cells to restrict flow paths of hydrogen and oxygen. The separator is made of a conductor to move electrons during oxidation/reduction reactions.

When hydrogen is supplied to the anode, the hydrogen is divided into hydrogen ions and electrons by a catalyst. The electrons produce electricity while moving outside the fuel cell stack through the separator. The hydrogen ions pass through the electrolyte membrane and move to the cathode, after which the hydrogen ions are combined with oxygen supplied from ambient air and electrons to produce water, and the water produced is discharged to the outside.

A fuel cell system includes an exhaust gas pressure regulating apparatus (or a working pressure regulating apparatus) for regulating the working pressure of a fuel cell stack. The exhaust gas pressure regulating apparatus may regulate the working pressure of the fuel cell stack by regulating the pressure of exhaust gas from an outlet end of the fuel cell stack.

In the related art, an exhaust gas pressure regulating apparatus installed at a rear end of a fuel cell stack to regulate the working pressure of a fuel cell system may generate a turbulent flow of exhaust gas to cause noise due to the structure for suppressing a flow of the exhaust gas.

To reduce the noise, it may be considered to additionally install a silencer or increase the thickness of a tube or a hose through which the exhaust gas flows. However, in this case, the structure of the exhaust gas pressure regulating apparatus may be complicated, and the weight and manufacturing cost thereof may be increased.

SUMMARY

One aspect of the present disclosure provides an exhaust gas pressure regulating apparatus for reducing flow noise of exhaust gas.

Another aspect of the present disclosure provides an exhaust gas pressure regulating apparatus having a more compact and lighter structure than an exhaust gas pressure regulating apparatus in the related art.

According to an aspect of the present disclosure, an apparatus for regulating pressure of exhaust gas of a fuel cell system includes porous foam mounted in an exhaust tube and having a plurality of pores therein and a regulator that compresses or expands the porous foam to regulate a differential pressure of the exhaust gas flowing through the exhaust tube.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
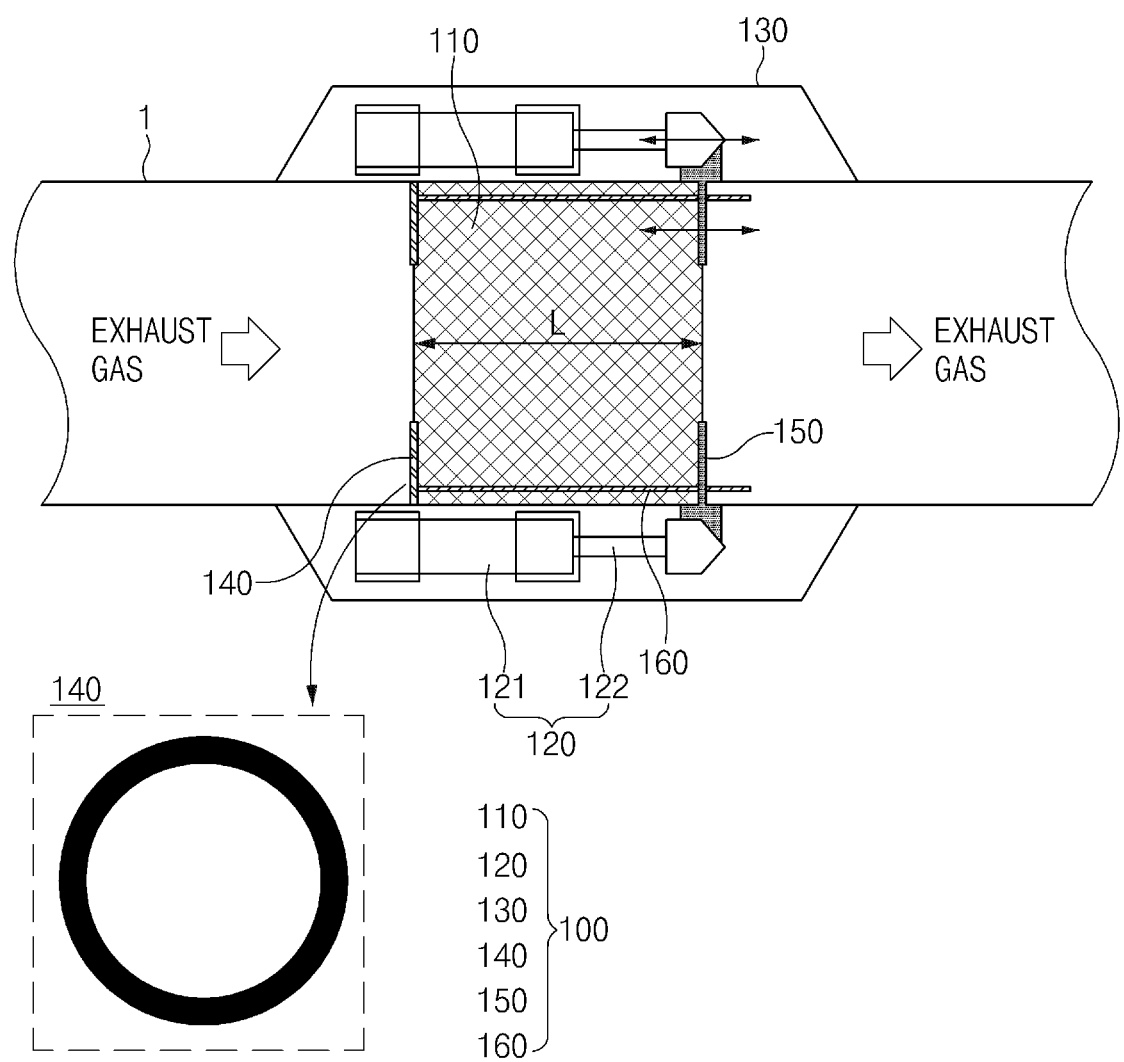
FIG. 1 is a schematic view illustrating an exhaust gas pressure regulating apparatus according to an aspect of the present disclosure, where the apparatus is mounted on an exhaust tube of a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, aspects of the present disclosure will be described in detail with reference to the accompanying drawings. It should be understood that even if shown in different drawings, identical components are provided with identical reference numerals in the drawings. Furthermore, in describing the aspects of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe components of the present disclosure. Such terms are only used to distinguish one component from another component, and the substance, sequence, order, or number of these components is not limited by these terms. If a component were described as "connected", "coupled", or "linked" to another component, they may mean the components are not only directly "connected", "coupled", or "linked" but also are indirectly "connected", "coupled", or "linked" via a third component.

FIG. 1 is a schematic view illustrating an exhaust gas pressure regulating apparatus according to an aspect of the present disclosure, where the apparatus is mounted on an exhaust tube of a vehicle.

The exhaust gas pressure regulating apparatus 100 may be installed in an exhaust system of a fuel cell vehicle to regulate the pressure of exhaust gas released from a fuel cell stack.

By the regulation of the pressure of the exhaust gas, which is released from the fuel cell stack, by the exhaust gas pressure regulating apparatus 100, the amount of supply gas flowing into the fuel cell stack may also be regulated because a pressure differential between an inlet end and an outlet end of the fuel cell stack varies.

Referring to FIG. 1, the exhaust gas pressure regulating apparatus 100 may be mounted on the exhaust tube 1 of the vehicle, through which the exhaust gas released from the fuel cell stack flows, to regulate a differential pressure of the exhaust gas. The differential pressure of the exhaust gas may be defined as a difference between the pressures of the exhaust gas before and after the passage of the exhaust gas through the exhaust gas pressure regulating apparatus 100.

The exhaust gas pressure regulating apparatus 100 according to this aspect includes porous foam 110 and a regulator 120.

The porous foam 110 may be mounted in the exhaust tube 1. The porous foam 110 has a structure containing a plurality of pores or air gaps. For example, the porous foam 110 may have a structure such as mesh foam, a sponge, or the like.

The porous foam 110 may be compressed or expanded, and the volume of the porous foam 110 may be varied according to the compression or expansion of the porous foam 110. The porosity ϕ of the porous foam 110 may be varied with the volume variation thereof. The porosity ϕ may be given by Equation 1 below.

$$\phi = \frac{V_V}{V_S + V_V} \qquad \text{Equation 1}$$

Here, ϕ is the porosity, $V_S$ is the total volume of a material portion of the porous foam 110, and $V_V$ is the total volume of the pores in the porous foam 110.

The regulator 120 may compress or expand the porous foam 110.

The exhaust gas pressure regulating apparatus 100 is configured such that, as the porous foam 110 is compressed or expanded by the regulator 120, the porosity ϕ of the porous foam 110 is varied to regulate the differential pressure of the exhaust gas that flows through the exhaust tube 1.

In the related art, an exhaust gas pressure regulating apparatus installed at a rear end of a fuel cell stack to regulate the working pressure of a fuel cell system may generate a turbulent flow of exhaust gas to cause noise due to the structure for suppressing a flow of the exhaust gas.

To reduce the noise, it may be considered to additionally install a silencer or increase the thickness of a tube or a hose through which the exhaust gas flows. However, in this case, the structure of the exhaust gas pressure regulating apparatus may be complicated, and the weight and manufacturing cost thereof may be increased.

The exhaust gas pressure regulating apparatus 100 according to this aspect is aimed at reducing flow noise of exhaust gas that may be generated in the process of regulating the pressure of the exhaust gas.

More specifically, the exhaust gas pressure regulating apparatus 100 according to this aspect has a basic feature wherein, as the porous foam 110 is compressed or expanded by the regulator 120, the porosity ϕ of the porous foam 110 is varied to regulate the differential pressure of the exhaust gas that flows through the exhaust tube 1.

Features of the exhaust gas pressure regulating apparatus 100 according to this aspect will be described below in more detail.

Referring to FIG. 1, one end of the porous foam 110 may be fixed to the exhaust tube 1 and an opposite end of the porous foam 110 may be coupled to the regulator 120 with respect to the flow direction of the exhaust gas in the exhaust tube 1.

In an aspect, the one end of the porous foam 110 fixed to the exhaust tube 1 may be located upstream and the opposite end of the porous foam 110 coupled to the regulator 120 may be located downstream with respect to the flow direction of the exhaust gas.

Assuming that the one end of the porous foam 110 fixed to the exhaust tube 1 is located downstream and the opposite end of the porous foam 110 coupled to the regulator 120 is located upstream with respect to the flow direction of the exhaust gas, the porous foam 110 may be compressed by the flow resistance of the exhaust gas. That is because the movable opposite end of the porous foam 110 is located upstream of the fixed one end thereof. When the porous foam 110 is compressed due to the flow resistance of the exhaust gas, the porosity ϕ of the porous foam 110 may be lowered to increase the differential pressure of the exhaust gas. Accordingly, the flow resistance of the exhaust gas may be further increased, and the porous foam 110 may be further compressed. In this case, the differential pressure of the exhaust gas may be excessively increased.

In this aspect, the one end of the porous foam 110 fixed to the exhaust tube 1 is located upstream and the opposite end of the porous foam 110 coupled to the regulator 120 is located downstream with respect to the flow direction of the exhaust gas. Accordingly, the porous foam 110 is forced by the flow resistance of the exhaust gas in the direction in which the porous foam 110 expands, and is expanded or compressed by the regulator 120. As a result, the performance of the fuel cell stack may be inhibited from being degraded on account of the suppression of a gas flow into the fuel cell stack due to an excessive increase in the differential pressure of the exhaust gas that is caused by the flow resistance of the exhaust gas.

As the opposite end of the porous foam 110 is moved by the regulator 120, the length L of the porous foam 110 in the flow direction of the exhaust gas may be increased or decreased.

The regulator 120 may include an actuator 121 and a movable part 122.

The actuator 121 may include, but is not limited to, at least one of a gear apparatus, a motor, and an electronic drive apparatus, and any unit capable of linearly moving the movable part 122 may be used as the actuator 121.

For example, the actuator 121 may include a cylinder that provides a driving force for linearly moving the movable part 122.

Referring to FIG. 1, the actuator 121 may be mounted on the outer circumferential surface of the exhaust tube 1 to provide a driving force to the movable part 122.

The movable part 122 may be linearly moved by the driving force from the actuator 121.

Referring to FIG. 1, the movable part 122 may be provided outside the exhaust tube 1 and may be coupled to the opposite end of the porous foam 110.

The movable part 122 may be moved in the lengthwise direction L of the porous foam 110 by the driving force from the actuator 121.

In an aspect, the actuator 121 may include a cylinder, and the movable part 122 may include a piston inserted into the cylinder.

The exhaust gas pressure regulating apparatus 100 may further include a first support part 140.

The one end of the porous foam 110 may be fixed to the inner circumferential surface of the exhaust tube 1 by the first support part 140. The first support part 140 may be mounted in the exhaust tube 1 to cause the porous foam 110 and the exhaust tube 1 to be coupled together by the first support part 140.

The first support part 140 may suppress the one end of the porous foam 110 from being deformed by a flow of the exhaust gas while fixing the one end of the porous foam 110 to the inner circumferential surface of the exhaust tube 1.

The first support part 140 may extend toward a central portion of the exhaust tube 1 from the inner circumferential surface of the exhaust tube 1.

Referring to FIG. 1, in an aspect, the first support part 140 may have a donut shape and may be coupled to a portion of the one end of the porous foam 110 that is in contact with the inner circumferential surface of the exhaust tube 1. The one end of the porous foam 110 may be deformed due to the flow resistance of the exhaust gas. However, since the first support part 140 supports a predetermined portion of the one end of the porous foam 110, the porous foam 110 may be suppressed from being deformed due to the flow resistance of the exhaust gas.

Accordingly, the exhaust gas pressure regulating apparatus 100 may effectively regulate the pressure of the exhaust gas.

The exhaust gas pressure regulating apparatus 100 may further include a second support part 150.

The second support part 150 may couple the opposite end of the porous foam 110 and the movable part 122. To enable the second support part 150 to move, the exhaust tube 1 has a slot extending in the direction in which the second support part 150 moves.

To suppress the opposite end of the porous foam 110 from being deformed by the flow of the exhaust gas, the second support part 150 may have a shape extending toward the central portion of the exhaust tube 1 from the inner circumferential surface of the exhaust tube 1 and may be coupled to the opposite end of the porous foam 110.

In an aspect, the second support part 150 may have a donut shape and may be coupled to a portion of the opposite end of the porous foam 110 that is in contact with the inner circumferential surface of the exhaust tube 1. The opposite end of the porous foam 110 may be deformed due to the flow resistance of the exhaust gas. However, since the second support part 150 supports a predetermined portion of the opposite end of the porous foam 110, the porous foam 110 may be suppressed from being deformed due to the flow resistance of the exhaust gas.

Accordingly, the exhaust gas pressure regulating apparatus 100 may effectively regulate the pressure of the exhaust gas.

The exhaust gas pressure regulating apparatus 100 may further include a housing 130 to prevent or inhibit leakage of the exhaust gas from the exhaust tube 1.

The housing 130 may have an inner space in which the regulator 120 is accommodated. The housing 130 may have a shape that surrounds the regulator 120 and a portion of the exhaust tube 1 on which the regulator 120 is mounted.

The exhaust gas pressure regulating apparatus 100 may further include a linear guide 160 for guiding the linear movement of the movable part 122.

The linear guide 160 may be mounted on the inner or outer circumferential surface of the exhaust tube 1.

Referring to FIG. 1, in an aspect, the linear guide 160 may be mounted on the inner circumferential surface of the exhaust tube 1 and may extend in the lengthwise direction in which the porous foam 110 is compressed or expanded.

The linear guide 160 may lead the porous foam 110 to deform in the lengthwise direction, and therefore the regulation of the exhaust gas pressure may be effectively performed according to the contraction and expansion of the porous foam 110.

Figure 2:
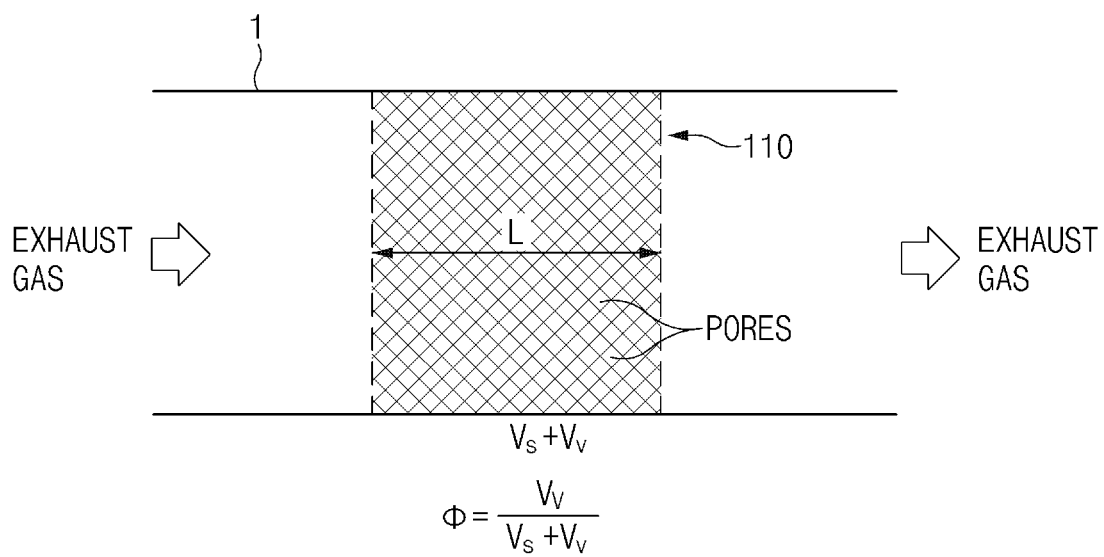
FIG. 2 is a view illustrating the operating principle of the exhaust gas pressure regulating apparatus of FIG. 1.
Figure 3:
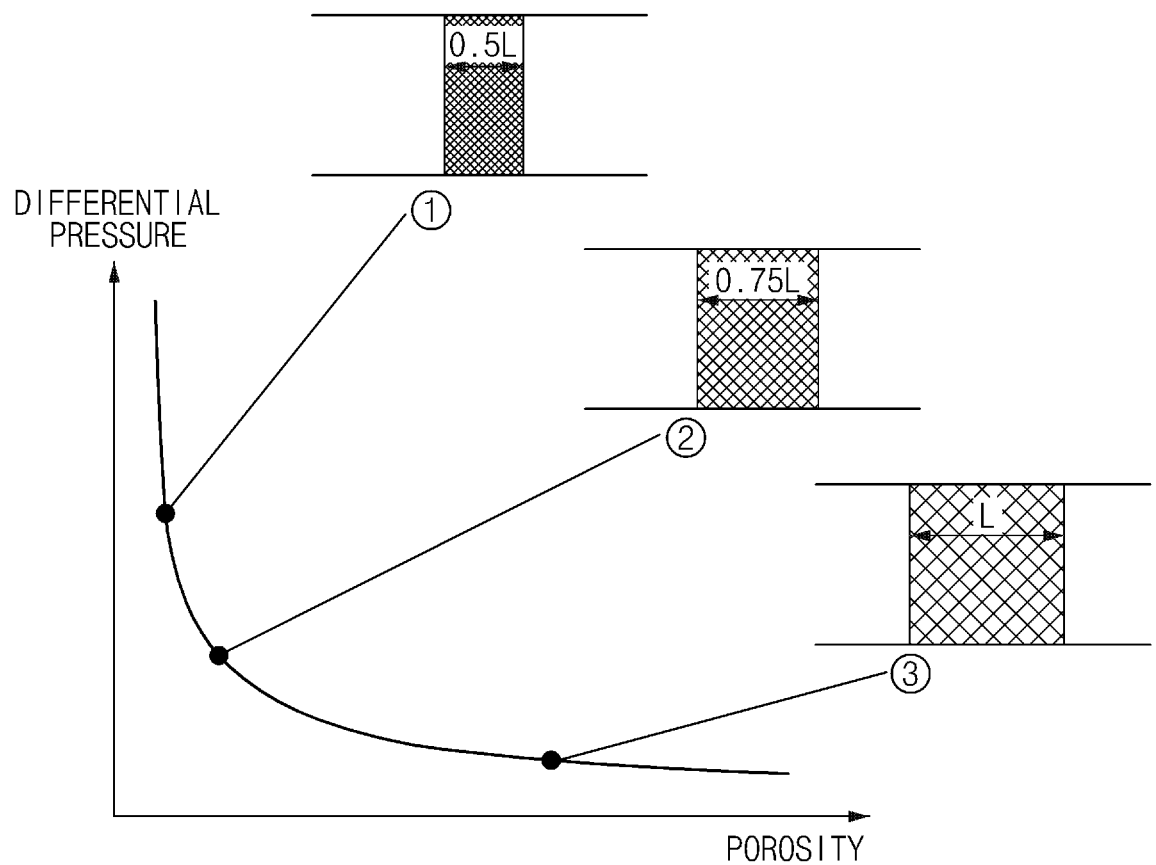
FIG. 3 is a view illustrating effects of the exhaust gas pressure regulating apparatus of FIG. 1.

FIG. 2 is a view illustrating the operating principle of the exhaust gas pressure regulating apparatus of FIG. 1, and FIG. 3 is a view illustrating effects of the exhaust gas pressure regulating apparatus of FIG. 1.

Hereinafter, the operating principle and effects of the exhaust gas pressure regulating apparatus 100 according to the present disclosure will be described with reference to FIGS. 2 and 3.

Referring to FIG. 2, the porous foam 110 may have a structure containing a plurality of pores.

The total volume containing a portion formed of the material of the porous foam 110 and a portion formed of the pores may be defined as $V_S+V_V$. Here, $V_S$ is the total volume that the material portion occupies in the total volume $V_S+V_V$ of the porous foam 110, and $V_V$ is the total volume that the pore portion occupies in the total volume $V_S+V_V$ of the porous foam 110.

When the porous foam 110 is expanded or contracted in the lengthwise direction L (see FIG. 2) by the regulator 120, the total volume $V_S+V_V$ of the porous foam 110 varies. At this time, the total volume $V_S$ of the material portion is almost constant since the volume of the material is almost unchanged. Meanwhile, the total volume $V_V$ of the pore portion varies since the volumes of the pores are easily varied by pressure. Accordingly, the porosity $\phi$ that is defined as a fraction of the total volume $V_V$ of the pore portion over the total volume $V_S+V_V$ increases as the porous foam 110 expands and decreases as the porous foam 110 contracts.

When the porosity ϕ is increased by the expansion of the porous foam 110, the flow resistance to which the exhaust gas is subjected while passing through the porous foam 110 may be decreased. The decrease in the flow resistance may be understood to be caused by a sparse structure of the porous foam 110 according to the increase in the porosity ϕ of the porous foam 110. Accordingly, the differential pressure of the exhaust gas may be decreased, and therefore the pressure of the exhaust gas at the rear end of the fuel cell stack may be decreased.

In contrast, when the porosity ϕ is decreased by the contraction of the porous foam 110, the porous foam 110 may have a denser structure, and the flow resistance to which the exhaust gas is subjected while passing through the porous foam 110 may be increased. Accordingly, the differential pressure of the exhaust gas may be increased, and therefore the pressure of the exhaust gas at the rear end of the fuel cell stack may be increased.

A correlation between the porosity ϕ of the porous foam 110 and the differential pressure of the exhaust gas may be represented as in the graph of FIG. 3.

As the porosity ϕ is increased by the expansion of the porous foam 110, the differential pressure of the exhaust gas may gradually decrease and then converge to a predetermined value.

As the porosity ϕ is decreased by the contraction of the porous foam 110, the differential pressure of the exhaust gas may increase, and the rate of increase in the differential pressure of the exhaust gas may become larger.

According to the above-configured exhaust gas pressure regulating apparatus, a turbulent flow component of the exhaust gas may be decreased by the porous foam 110, and therefore noise caused by the turbulent flow of the exhaust gas may be reduced. Accordingly, a silencer separately mounted in a vehicle to reduce flow noise of exhaust gas may be omitted.

Furthermore, since the exhaust gas pressure regulating apparatus according to the present disclosure has a relatively constant shape without a structure, such as a disk or a flap, which a normal valve has, the exhaust gas may more uniformly flow through the exhaust gas pressure regulating apparatus. Accordingly, the smooth flow of the exhaust gas may reduce the flow resistance between the exhaust gas and the exhaust system and may improve the pressure regulation performance of the exhaust gas pressure regulating apparatus.

According to the aspects of the present disclosure, at least the following effects are achieved.

First, the exhaust gas pressure regulating apparatus may regulate the pressure of exhaust gas with the porous foam and the regulator for compressing and expanding the porous foam, thereby reducing a turbulent flow component of the exhaust gas passing through the apparatus and thus reducing flow noise of the exhaust gas.

Second, the exhaust gas pressure regulating apparatus may have a simpler configuration and be made lighter in weight than an exhaust gas pressure regulating apparatus in the related art.

Effects of the present disclosure are not limited to the aforementioned effects, and any other effects not mentioned herein will be clearly understood from the accompanying claims by those skilled in the art to which the present disclosure pertains.

Hereinabove, although the present disclosure has been described with reference to examples and the accompanying drawings, the present disclosure is not limited thereto, but may be variously modified and altered by those skilled in the art to which the present disclosure pertains without departing from the spirit and scope of the present disclosure.

What is claimed is:

1. An apparatus for regulating pressure of exhaust gas of a fuel cell system, the apparatus comprising:
   porous foam mounted in an exhaust tube and having a structure in a mesh foam with a plurality of pores therein;
   a regulator configured to compress or expand the porous foam to regulate a differential pressure of exhaust gas flowing through the exhaust tube; and
   a first support part configured to fix one end of the porous foam to an inner circumferential surface of the exhaust tube, wherein the first support part has a shape extending toward a central portion of the exhaust tube from the inner circumferential surface of the exhaust tube and is configured to suppress the one end of the porous foam from being deformed by exhaust gas flow,
   wherein the one end of the porous foam is fixed to the exhaust tube and an opposite end of the porous foam is coupled to the regulator with respect to a flow direction of the exhaust gas in the exhaust tube,
   wherein a length of the porous foam in the flow direction of the exhaust gas is increased or decreased as the opposite end of the porous foam is moved by the regulator,
   wherein the regulator is disposed outer side of the plurality of pores in a direction perpendicular to the flow direction of the exhaust gas,
   wherein the regulator compresses or expands the porous foam to vary porosity of the porous foam, and flow resistance to which the exhaust gas is subjected while passing through the porous foam varies as the porosity of the porous foam varies so that the differential pressure of the exhaust gas flowing through the exhaust tube is regulated, and
   wherein the porosity is given by:

$$\phi = \frac{V_V}{V_S + V_V}$$

where ϕ is the porosity, $V_S$ is a total volume of a material portion of the porous foam, and $V_V$ is a total volume of the pores in the porous foam.

2. The apparatus of claim 1, wherein the regulator includes an actuator and a movable part coupled to the opposite end of the porous foam and linearly moved by a driving force from the actuator.

3. The apparatus of claim 2, wherein the actuator includes a cylinder configured to provide the driving force for linearly moving the movable part.

4. The apparatus of claim 1, wherein the one end and the opposite end of the porous foam are located upstream and downstream, respectively, with respect to the flow direction of the exhaust gas.

5. The apparatus of claim 1, further comprising:
   a housing configured to surround the regulator and a portion of the exhaust tube on which the regulator is mounted, to inhibit leakage of the exhaust gas from the exhaust tube.

6. The apparatus of claim 1, wherein the regulator includes an actuator and a movable part linearly moved by a driving force from the actuator, and wherein the apparatus further comprises a second support part configured to couple the opposite end of the porous foam and the movable part.

7. The apparatus of claim 6, wherein the second support part extends toward a central portion of the exhaust tube from an inner circumferential surface of the exhaust tube and is coupled to the opposite end of the porous foam to suppress the opposite end of the porous foam from being deformed by the flow of the exhaust gas.

8. The apparatus of claim 6, wherein the exhaust tube has a slot extending in a direction in which the second support part moves, to enable the second support part to move.

9. The apparatus of claim 1, wherein the regulator includes an actuator and a movable part linearly moved by a driving force from the actuator, and
wherein the apparatus further comprises a linear guide configured to guide linear movement of the movable part.

* * * * *